FIRING CIRCUITS FOR SERIES-CONNECTED THYRISTORS

Filed Dec. 19, 1966

WITNESSES:

Leon M. Garman

James F. Young

INVENTORS
Robert Murray, Jr.
and Leslie R. Rice
BY
C. L. Menzemer
ATTORNEY

United States Patent Office 3,497,726
Patented Feb. 24, 1970

3,497,726
FIRING CIRCUITS FOR SERIES-CONNECTED THYRISTORS

Leslie R. Rice, Monroeville, and Robert Murray, Jr., Pittsburgh, Pa., assignors to Westinghouse Electric Corporation, Pittsburgh, Pa., a corporation of Pennsylvania
Filed Dec. 19, 1966, Ser. No. 602,757
Int. Cl. H03k 3/26
U.S. Cl. 307—284 9 Claims

ABSTRACT OF THE DISCLOSURE

Apparatus for supplying firing pulses to a plurality of controlled rectifier devices connected in a series string is disclosed wherein the series string is connected between a high voltage source and ground potential and wherein a tubular member is provided including therein radiating means at one end for radiating radio frequency firing signals through a dielectric medium to detecting, amplifying and pulse forming means disposed at the other end of the tubular member. In response to the radiated signals the detecting, amplifying and pulse forming means apply firing pulses to at least one of the controlled rectifiers in the series string, with the detecting, amplifying and pulse forming means being at the potential of the rectifier device to which firing pulses are supplied, thus being essentially isolated from ground through the dielectric medium.

Figure 1:
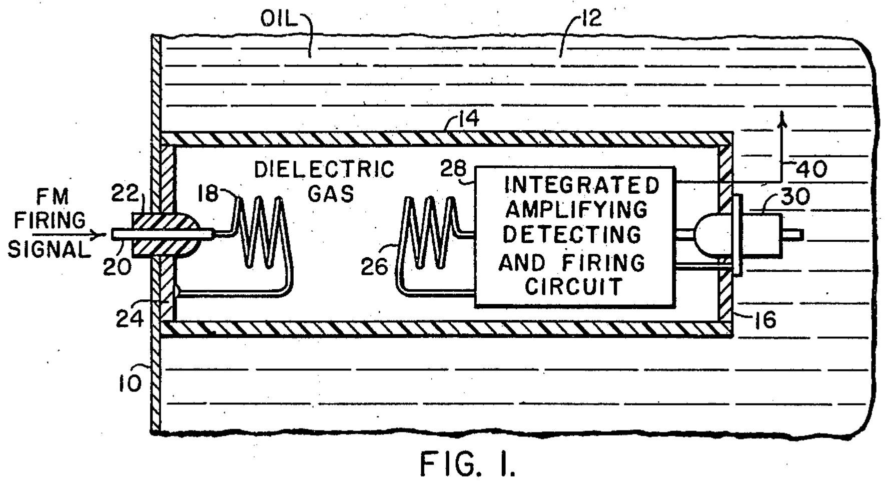

This invention relates to firing circuits for series-connected semiconductive controlled rectifiers operated at high voltages. More particularly, the invention relates to firing circuits for high voltage thyristors which eliminate the troublesome problems of conventional firing circuits in attempting to isolate them from ground.

As is known, conventional techniques used to fire thyristors create many problems when a number of the thyristors are connected in series to rectify high voltage alternating currents, or for other purposes. Series-connected thyristors of this type are connected between ground potential and a source of high positive potential, while the firing circuit for each thyristor is normally connected between its gate and cathode. If it is assumed, for example, that a string of thyristors is connected between ground and 50,000 volts positive potential, the gate of the thyristor closest to the positive terminal of the string will also be at approximately 50,000 volts with respect to ground. As will be understood, this creates serious problems in eliminating impedance paths, particularly capacitive coupling, between the firing circuit and ground. In this respect, the junction capacitances of the thyristors and their shunt capacitances form a ladder network with the gate capacitances to ground. The distribution of voltage along this ladder network is exponential (i.e. varies along its length). The dielectric strength of the insulation used in the gate firing circuit is, of course, limited; and if the impedance paths are not eliminated, the aforesaid exponential voltage distribution together with serious corona effects and/or flashover will result. Moreover, these problems are accentuated if the rectifying thyristors are to be immersed in oil.

As an overall object, the present invention provides a new and improved system for firing high voltage series-connected thyristors, which system eliminates the troublesome problems of prior art systems because of impedance paths between the firing circuits of the thyristors and ground.

Another object of the invention is to provide a system for firing high voltage series-connected thyristors in which the firing circuit for each thyristor is effectively isolated from all other parts of the system by a column of gas of high dielectric strength.

Still another object of the invention is to provide a remote control system for thyristor circuits utilizing frequency modulated radio frequency energy as a gating signal in combination with a frequency modulation detector which prevents false triggering of the thyristors by spurious signals.

In accordance with the invention, a control system for series-connected thyristors is provided in which the firing circuit for each thyristor comprises a frequency modulation detector adapted to detect a frequency modulated signal which was generated at a remote point and convert it into a firing pulse for the thyristor. The frequency modulated firing signal is received by the frequency modulated detector by means of a pickup coil or antenna, this antenna being spaced from a transmitting antenna, preferably in a column of gas of high dielectric strength such as sulfur hexafluoride. Hence, the only connection between the firing circuit and ground is by means of a beam of radio frequency energy traveling through a gas of high dielectric strength to provide highly effective isolation.

In the case where the thyristors are immersed in oil, the transmitting and receiving antennas, as well as the frequency modulation detector, are preferably enclosed within a tube containing the aforesaid gas of high dielectric strength. The transmitting antenna extends through the wall of the oil tank and, of course, will be at substantially ground potential. The receiving antenna, on the other hand, will be at a much higher potential; but since it is separated from the transmitting antenna by the high dielectric gas, effective isolation is provided.

Figure 2:
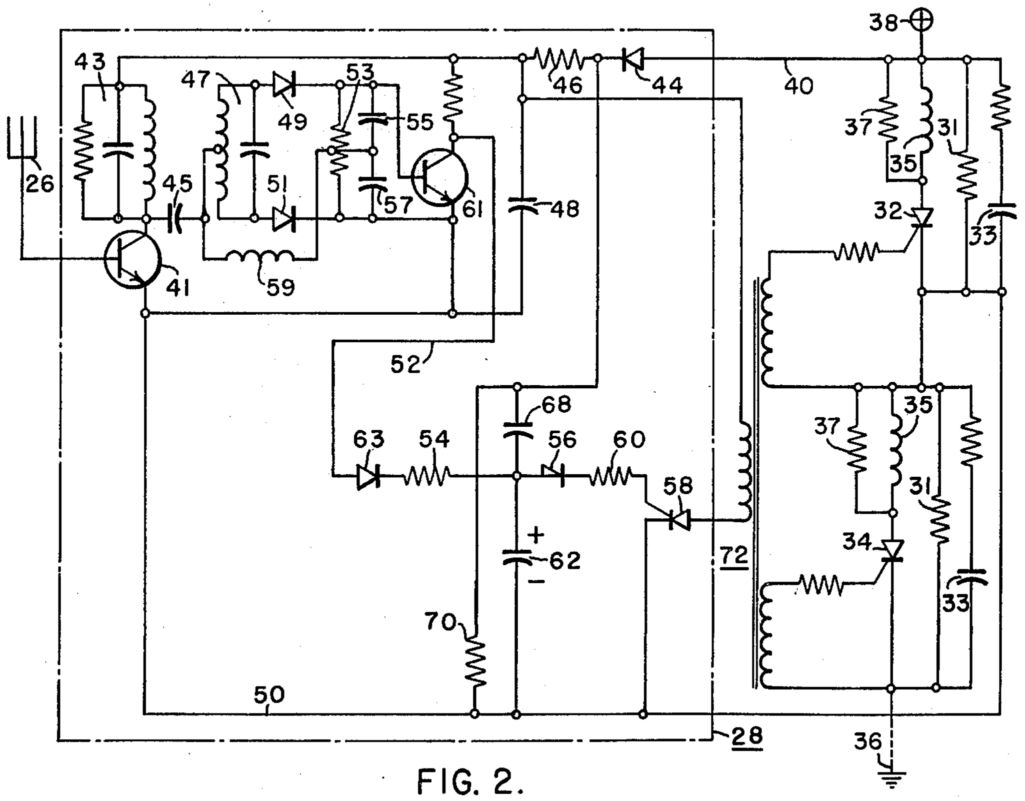

The above and other objects and features of the invention will become apparent from the following detailed description taken in connection with the accompanying drawings which form a part of this specification, and in which:

FIGURE 1 is a schematic illustration of the coupling tube utilized in accordance with the teachings of the invention for the purpose of transferring control information from an external point to series thyristor strings without impedance paths to ground; and FIG. 2 is a schematic diagram of the frequency modulation detector and trigger circuit of the invention for firing high voltage series-connected thyristors.

With reference now to the drawings, and particularly to FIG. 1, one wall 10 of a tank containing oil 12 is shown. The tank also contains a series string of thyristors, not shown in FIG. 1, having one terminal of the series string connected to ground and the other terminal connected to a source of high positive potential. The tank wall 10 will normally be at ground potential, while the oil 12 serves as a dielectric substance surrounding the thyristors and also serves to dissipate the heat generated by the thyristors.

Connected to the wall 10 of the tank are a plurality of tubes, one for each of the thyristors in the aforesaid series string. Only one such tube is shown in FIG. 1 and identified by the reference numeral 14. The tube is preferably formed from plastic or other similar material of high dielectric strength and is secured to the wall 10 by any suitable means, not shown. The end of the tube 14 remote from the wall 10 is sealed by means of a cap 16, also formed from plastic or other material of high dielectric strength.

At the left end of the tube 14, as viewed in FIG. 1, is a transmitting antenna or coil 18 having its one end connected to a probe 20 extending through an insulator 22 projecting through the tank wall 10. The other end of the coil 18 is connected to a plate 24 to provide a coaxial connection in the tank wall.

When frequency modulated radio frequency energy is impressed upon the transmitting coil 18 as from an external generator, it will be picked up by the receiving antenna or coil 26 at the other end of the tube 14. This received frequency modulated energy is then detected and amplified in an integrated circuit module 28, also contained within the tube 14. As will hereinafter be explained, the output of the integrated circuit 28 as applied to coaxial connection 30 at the right end of tube 14 is a pulse which is impressed between the gate and cathode of a thyristor for the purpose of causing it to fire. With this arrangement, the elements at the right end of tube 14, namely coil 26 and integrated circuitry 28, will be at a very high potential determined by the potential on the gate electrode of the thyristor or thyristors to which it is connected. The elements at the other end of the tube 14 (i.e., elements 18, 20 and 24) will be at ground potential. However, arcing and corona effects between the transmitting and receiving coils 18 and 26, respectively, are prevented by providing a sufficient spacing between the two coils and by filling the tube 14 with a dielectric gas such as sulfur hexafluoride.

One of the important considerations in utilizing radio frequency energy for the purpose of firing thyristors is the effect of local or spurious signals which might cause false triggering. Shielding of the oil and steel around the pick-up coil 26 can well reduce most of the stray energy; however, coupling through impedance paths to ground may still pass radio frequency energy to cause false triggering of a thyristor. Impulse noise of this sort is usually found in the range of about 15 to 160 megacycles. For example, fluctuation noise occurs below 20 megacycles while discharge noise from mercury rectifiers and similar devices go to very high frequencies with considerable intensity. The important point, however, is that almost all of this noise is of the amplitude modulated type which will be removed from the system by the frequency modulation detector in circuitry 28.

Thus, frequency modulated energy, within the bandwidth of a remote transmitter, is applied through the coaxial connection in the tank wall to the transmitting coil 18. This energy is picked up by the receiving coil 26 and amplified and detected by the circuitry 28 at the right end of tube 14. If the radio frequency energy picked up by coil 26 is in the right frequency range to be detected by the detector in circuit 28 and deviated in frequency in a sufficient amount, an output signal is generated which, if large enough, will break down a trigger diode in a manner hereinafter described to fire an associated thyristor in the aforesaid series string.

With reference now to FIG. 2, the integrated circuitry 28 is shown enclosed by broken lines. Two high voltage thyristors 32 and 34 in a series string of such thyristors are shown. The thyristors may, for example, be as much as fifty in number and are connected between ground potential at 36 and a source of high positive potential, such as 50,000 volts, at 38. Due to differences in leakage currents, junction capacities, and reverse recovery times, voltage balancing networks must be provided to equalize the voltage distributed along the series string of controlled rectifiers. Each of these voltage balancing networks comprises a resistor 31 and capacitor 33 in shunt with an associated one of the thyristors 32 or 34. A series line reactor 35 in shunt with a resistor 37 is also provided for each thyristor. As will be seen, the voltage across the resistor 31 serves as a source of driving potential for the amplifier and detector as well as the firing circuit in element 28 presently to be described. Thus, the upper end of resistor 31 in shunt with thyristor 32, for example, is connected through lead 40, diode 44, resistor 46, capacitor 48 and lead 50 to the lower end of the same resistor 31. The voltage across capacitor 48 is utilized to drive the amplifier and detector and, in effect, comprises its B+ voltage source.

When a frequency modulated signal is received on coil 26, it will be applied to the base of a transistor 41 in the integrated circuit 28. The emitter of transistor 41 is connected to one side of the capacitor 48, while its collector is connected through resonant circuit 43 to the other side of the capacitor 48 which, as mentioned above, generates the B+ voltage for the detector and amplifier. The emitter of transistor 41 is coupled through capacitor 45 to the center tap of an inductor in a second resonant circuit 47, the two resonant circuits 43 and 47 being inductively coupled and tuned to the same frequency. Connected to the opposite ends of the resonant circuit 47 are diodes 49 and 51. The cathodes of these diodes are connected together through a load resistor 53 in shunt with capacitors 55 and 57, the junction of the capacitors and the midpoint of resistor 53 being connected through inductors 59 to the center tap of the inductor in resonant circuit 47.

It will be immediately apparent that the circuit just described comprises a conventional frequency discriminator or frequency modulation detector. The output of the detector is amplified in transistor amplifier 61, also supplied with driving potential by the charged capacitor 48.

When a frequency modulated signal is detected and amplified by the circuitry just described, it will appear between leads 50 and 52, the lead 52 being connected to the collector of amplifying transistor 61 as shown. This signal is applied through diode 63 and resistor 54 to the anode of a breakdown diode 56. The cathode of diode 56 is connected to the gate electrode of a silicon controlled rectifier 58 through resistor 60; while its anode is connected through capacitor 62 to lead 50. Capacitor 62 is charged with the polarity shown through a current path including capacitor 68, the two capacitors 62 and 68 forming a capacitive divider which will detect dangerous forward voltages and trigger the thyristors 32 and 34 so that they will not be destroyed by two terminal anode firing. Note also that a resistor 70 is connected between leads 40 and 50 in shunt with elements 62 and 68. The resistor 70 serves the purpose of dissipating the energy in capacitors 62 and 68, such that they will be ready to measure new forward transients.

As was meantioned above, the detected signal is applied to the anode of diode 56 through resistor 54 which limits the power drain from the amplifier and detector since sustaining power for the diode 56 is derived from the charged capacitor 62. In the "off" state of the silicon controlled rectifier 58, the impedance of diode 56 is approximately $10^9$ ohms, meaning that the resistance of resistor 54 should be sufficient to accommodate this value. This insures that the power level in the circuit 28 is low and little power is required from across resistor 31 through elements 44, 46 and 48.

When a detected frequency modulated signal causes the diode 56 to break down, the silicon controlled rectifier 58 is triggered into conduction. Conduction through rectifier 58, in turn, causes current to flow through the primary winding of an output transformer 72, thereby producing a pulse which triggers the thyristors 32 and 34 into conduction. With the thyristors 32 and 34 in conduction, control deviation of the unit ceases until the next cycle of operation.

The foregoing discussion is, of course, concerned with only one "slave" triggering circuit for several thyristors in a complete series string. This technique, however, can be applied over and over as the number of thyristors is increased. Furthermore, for multiple legs such as those used in polyphase rectifiers and inverters, different channels can be used to control the different legs.

A very important advantage of the gate-firing technique of the invention is that the power for operating the amplifier and detector as well as the triggering circuit itself is derived across the voltage balancing network for an associated one of the thyristors. Thus, no external source of power is required for the trigger circuits and each trigger circuit more or less "floats" at the approximate voltage level of its associated thyristor without any impedance paths to ground. Thus, exponential voltage distribution along the string along with possible corona and/or arcing effects are eliminated, the entire connection between the trigger signal generating source and the firing circuit itself being through the dielectric gas in tube 14. As was mentioned above, the entire circuit 28 of FIG. 2 is preferably formed on a single semiconductor wafer so as to form an integrated circuit which requires a minimum of space in tube 14.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. In apparatus for supplying firing pulses to at least one semiconductive controlled rectifier or the like in a series string of such rectifiers having one end of the series string connected to a point of ground potential, the combination of a tubular member including a dielectric medium other than air extending therethrough, means disposed within said tubular member at ground potential for radiating a radio frequency firing signal, means disposed within said tubular member spaced from said radiating means for detecting and amplifying said firing signal through said dielectric medium, and means disposed within said tubular member responsive to the detected signal for forming a firing pulse and applying the firing pulse to the gate electrode of at least one of said semiconductive controlled rectifiers in the series string, said detecting, amplifying and pulse forming means being at the potential of said one rectifier in the series string and essentially isolated from ground potential through said dielectric medium.

2. The apparatus of claim 1 wherein driving potential for said detecting, amplifying and pulse forming means is derived across a resistor in shunt with a semiconductive controlled rectifier in said series string.

3. The apparatus of claim 2 wherein opposite ends of said resistor are interconnected through a series circuit including a diode and capacitor, the voltage across the capacitor serving as the driving potential source for said detecting and amplifying means.

4. The apparatus of claim 1 wherein the radio frequency firing signal is frequency modulated and said detecting means comprises a frequency modulation detector.

5. The apparatus of claim 1 wherein the series of thyristors are immersed in oil and said tubular member is also immersed in the oil.

6. The apparatus of claim 5 wherein said radiating means includes a radiating coil at one end of said tubular member and the detecting means includes a pickup coil at the other end of said tubular member.

7. The apparatus of claim 6 wherein the tubular member is sealed and filled with a gas having a dielectric strength greater than that of air.

8. The apparatus of claim 6 wherein the tubular member and said series string of rectifiers are disposed in a tank containing said oil, said one end of said tubular member being secured to the tank wall at ground potential, and a portion of the radiating means extending through the tank wall.

9. The apparatus of claim 8 wherein said detecting, amplifying and pulse forming means comprise an integrated circuit disposed along with said pickup coil at the other end of the tubular member remote from the tank wall.

References Cited

UNITED STATES PATENTS

| | | | |
|---|---|---|---|
| 2,891,156 | 6/1959 | Crow | 329—103 |
| 3,234,493 | 2/1966 | Zwelling et al. | 336—94 |
| 3,310,777 | 3/1967 | Fosdick. | |
| 3,386,027 | 5/1968 | Kilgore et al. | |

OTHER REFERENCES

G. Camilli and J. J. Chapman, gaseous insulation for high-voltage apparatus, February 1948, p. 35.

JOHN S. HEYMAN, Primary Examiner

DAVID CARTER, Assistant Examiner

U.S. Cl. X.R.

307—252; 325—64